US011657850B2

(12) United States Patent
Ahmed et al.

(10) Patent No.: US 11,657,850 B2
(45) Date of Patent: May 23, 2023

(54) VIRTUAL PRODUCT PLACEMENT

(71) Applicant: Amazon Technologies, Inc., Seattle, WA (US)

(72) Inventors: Ahmed Aly Saad Ahmed, Bothell, WA (US); Muhammad Raffay Hamid, Seattle, WA (US); Yongjun Wu, Bellevue, WA (US); Yash Chaturvedi, Issaquah, WA (US); Steven James Cox, Mill Creek, WA (US); Travis Silvers, Lynnwood, WA (US); Amit S. Jain, Bellevue, WA (US); Amjad Y. A. Abu Jbara, Bothell, WA (US); Prasanth Saraswatula, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/247,393

(22) Filed: Dec. 9, 2020

(65) Prior Publication Data

US 2022/0180898 A1 Jun. 9, 2022

(51) Int. Cl.
*G11B 27/031* (2006.01)
*G06V 20/64* (2022.01)
*G06V 20/40* (2022.01)

(52) U.S. Cl.
CPC ........ *G11B 27/031* (2013.01); *G06V 20/41* (2022.01); *G06V 20/64* (2022.01)

(58) Field of Classification Search
CPC ............ G11B 27/031; G06K 9/00201; G06K 9/00718

USPC ........................................................ 386/278
See application file for complete search history.

(56) References Cited

U.S. PATENT DOCUMENTS

| 10,096,169 | B1 | 10/2018 | Chenillo et al. | |
|---|---|---|---|---|
| 2008/0126226 | A1* | 5/2008 | Popkiewicz | G06Q 30/02 705/26.1 |
| 2009/0144801 | A1* | 6/2009 | Grouf | G06F 16/438 709/217 |
| 2011/0188836 | A1* | 8/2011 | Popkiewicz | G11B 27/036 386/300 |
| 2014/0359656 | A1 | 12/2014 | Banica et al. | |
| 2015/0071613 | A1* | 3/2015 | Dharssi | H04N 5/272 386/278 |
| 2015/0206343 | A1* | 7/2015 | Mattila | H04W 4/02 345/420 |
| 2017/0034583 | A1* | 2/2017 | Long | H04N 21/632 |
| 2017/0272485 | A1* | 9/2017 | Gordon | H04N 21/8586 |
| 2017/0374398 | A1 | 12/2017 | Rao et al. | |
| 2018/0096528 | A1* | 4/2018 | Needham | G06T 7/70 |
| 2018/0131975 | A1* | 5/2018 | Badawiyeh | H04N 21/2385 |
| 2019/0294881 | A1* | 9/2019 | Polak | G06K 9/4628 |
| 2019/0342356 | A1* | 11/2019 | Thomas | H04N 21/234309 |

(Continued)

OTHER PUBLICATIONS

Deloitte Perspectives: "Product placement effectiveness on cord-cutters", Nov. 21, 2019, https://www2.deloitte.com/us/en/pages/technology-media-and-telecommunications/articles/product-placement-effectiveness-on-cord-cutters.html# [retrieved on Sep. 28, 2021].

(Continued)

*Primary Examiner* — Loi H Tran
(74) *Attorney, Agent, or Firm* — Weaver Austin Villeneuve & Sampson LLP

(57) ABSTRACT

Techniques are described for automating virtual placements in video content.

20 Claims, 12 Drawing Sheets

(56) References Cited

U.S. PATENT DOCUMENTS

2020/0066025 A1* 2/2020 Peebler ............... G06T 7/11
2021/0329338 A1* 10/2021 Khov ............... G06K 9/00765

OTHER PUBLICATIONS

Edison: "Myriad opportunities: Mirriad Advertising", Jul. 14, 2020 https://www.edisongroup.com/publication/myriad-opportunites/27276/ [retrieved on Sep. 28, 2021].

NetImperative: "Tencent uses AI to put product placement ads into old movies", Oct. 18, 2019 http://www.netimperative.com/2019/10/18/tencent-uses-ai-to-put-product-placement-ads-into-old-movies/ [retrieved on Sep. 28, 2021].

VentureBeat: "Ryff lets advertisers place any virtual object into commercials and films", Sep. 13, 2018 https://venturebeat.com/2018/09/13/ryff-lets-advertisers-place-any-virtual-object-into-commercials-and-films/ [retrieved on Sep. 28, 2021].

Gysin, "AdApt: On-screen | Rivals race to perfect Digital Replacement Technology before Qatar 2022," Apr. 18, 2018, <https://www.linkedin.com/pulse/on-screen-rivals-race-perfect-digital-replacement-technology-gysin/> Downloaded Sep. 17, 2021, 13 pages.

Nie et al., "A Robust and Efficient Framework for Sports-Field Registration," 2021, <https://openaccess.thecvf.com/content/WACV2021/papers/Nie_A_Robust_and_Efficient_Framework_for_Sports-Field_Registration_WACV_2021_paper.pdf> Downloaded Sep. 17, 2021, 9 pages.

U.S. Appl. No. 17/448,039, filed Sep. 17, 2021, Wu et al.

Deloitte Perspectives: "Product placement effectiveness on cord-cutters", Nov. 21, 2019, https://www2.deloitte.com/us/en/pages/technology-media-and-telecommunications/articles/product-placement-effectiveness-on-cord-cutters.html# [retrieved on Dec. 9, 2020].

Edison: "Myriad opportunities: Mirriad Advertising", Jul. 14, 2020 https://www.edisongroup.com/publication/myriad-opportunities/27276/ [retrieved on Dec. 9, 2020].

Grzyb, Tomasz et al. "Is Product Placement Really Worse Than Traditional Commercials? Cognitive Load and Recalling of Advertised Brands" *Frontiers in Psychology*, vol. 9, Article 1519. Published online Aug. 20, 2018, doi:10.3389/fpsyg.2018.01519.

NetImperative: "Tencent uses AI to put product placement ads into old movies", Oct. 18, 2019 http://www.netimperative.com/2019/10/18/tencent-uses-ai-to-put-product-placement-ads-into-old-movies/ [retrieved on Dec. 9, 2020].

VentureBeat: "Ryff lets advertisers place any virtual object into commercials and films", Sep. 13, 2018 https://venturebeat.com/2018/09/13/ryff-lets-advertisers-place-any-virtual-object-into-commercials-and-films/ [retrieved on Dec. 9, 2020].

International Search Report and Written Opinion dated Feb. 22, 2022, in Application No. PCT/US2021/072525.

* cited by examiner

VIRTUAL PRODUCT PLACEMENT

BACKGROUND

Video content may be provided through a number of media, such as television and the Internet. Live streaming content, also referred to as broadcast content, includes channels or feeds with scheduled content (e.g., premium movie channels) as well as live broadcasts (e.g., sporting events, news, etc.). To finance broadcast content, advertisements are often placed during scheduled breaks between segments of the broadcast content. However, since advertisements interrupt the viewing experience, advertisements are typically viewed as annoying. As a result, viewers generally try to avoid watching advertisements through changing channels or fast-forwarding through the advertisements, when possible. Since the advertisements are not viewed in these instances, this decreases the impact of the advertisements on consumer purchasing decisions.

As technology advances made it increasingly possible for consumers to avoid watching more traditional advertisements, advertisers have turned to the manual placement of products or billboards during production of movies and television shows. To reach different audiences, manual product placement is often performed multiple times for the same scene, increasing the time and expense involved in media production costs.

More recently, with the advent of sophisticated video editing tools, advertisers are able to manually edit movies and television shows post-production to include virtual product placements or branding. However, the manual editing of video media can be a time-consuming process.

DETAILED DESCRIPTION

Figure 1A:
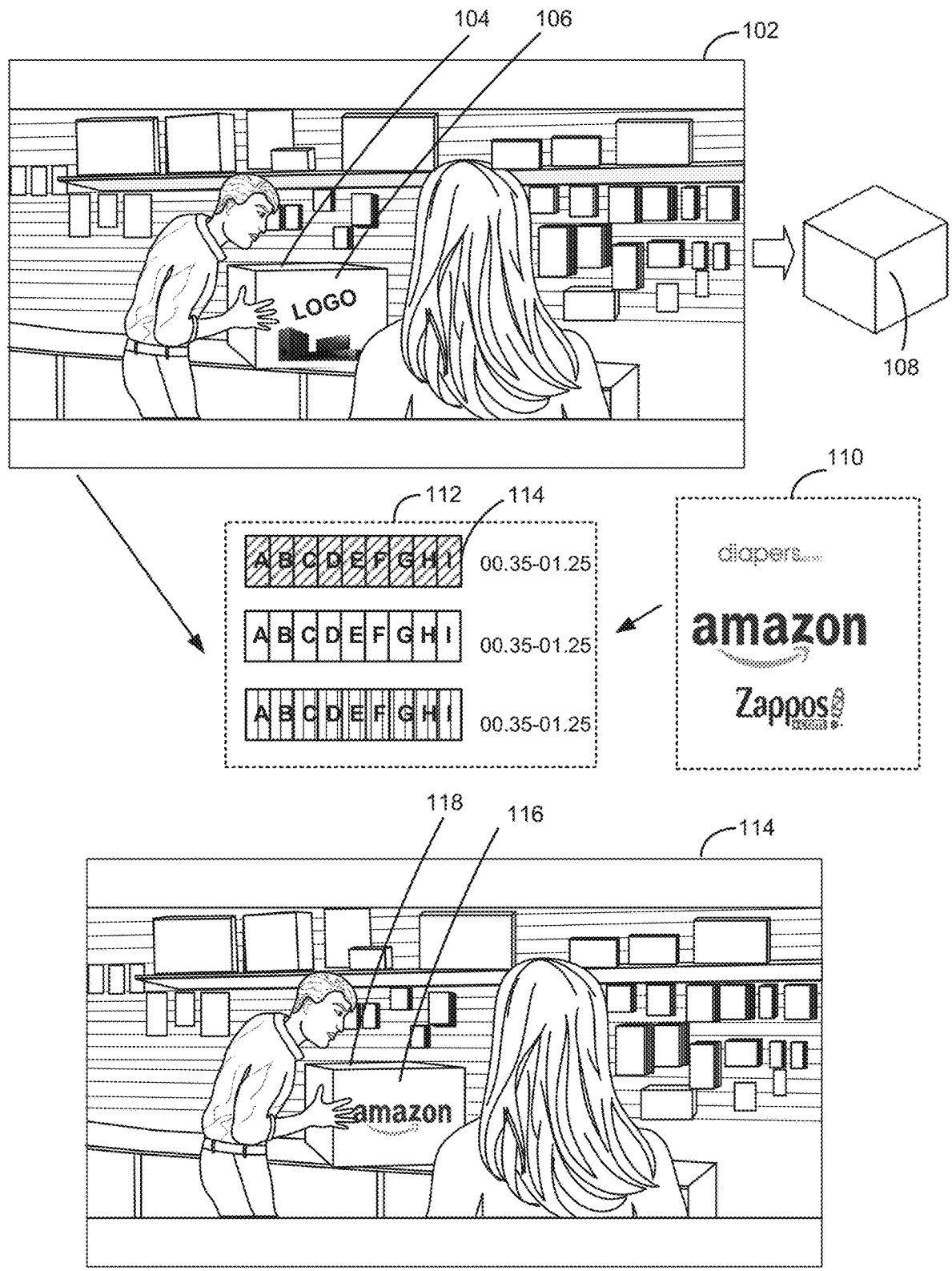
FIGS. 1A-1C illustrate examples of replacement clip generation as enabled by the present disclosure.

This disclosure describes techniques for replacing clips of a media content item with independently encoded and/or packaged replacement clips at the time of playback of the media content item. A "clip" is a sequence of successive frames of a media content item and may correspond to a scene or portion thereof. Replacement clips can be stitched with unmodified clips of the media content item at the time of playback such that they appear from the perspective of a client device to be part of a single streaming session. This replacement clip stitching can be used to facilitate the placement of targeted virtual product placements (VPPs) or branding in a video title such as a movie or television show without impacting the viewing experience. Replacement clips can be selected in real-time from a repository of replacement clips that have been generated prior to playback and streamed in place of corresponding clips of the video title.

Prior to playback, a data store is populated with information pertaining to media content items of a media library. This information for each media content item can be ascertained automatically through mining of various data sources, as well as the application of various computer vision and machine learning techniques.

The information that is collected and stored for a media content item may be analyzed to identify "candidate insertion points," within the media content item, at which secondary content may be "inserted" to achieve virtual product placements or branding. A candidate insertion point is a potential two-dimensional (2D) or three-dimensional (3D) placement for a virtual product or branding. Computer vision and machine learning techniques can be used to identify candidate insertion points, as well as attributes of an identified candidate insertion point. A candidate insertion point may be defined by a clip (e.g., scene) within the media content item, as well as candidate placement(s) corresponding to surfaces of physical object(s) represented within the clip on which a virtual product or branding can be placed. Attributes of a candidate insertion point can include a start time of the pertinent clip, an end time and/or duration of the pertinent clip, and attributes of pertinent physical object(s) represented within the clip. Attributes of an object represented within a clip can include a classification of the object (e.g., a desk, a bus, an empty wall, a billboard). Attributes of a candidate insertion point can also include attributes of the pertinent clip (e.g., scene) and/or media content item such as a setting or genre.

Replacement clips can be generated automatically for candidate insertion points of a media content item such as a video content title. Replacement clip generation may be performed according to various constraints. The constraints may be used to guide the selection of secondary content that will be used, in combination with clips of the media content item, to generate replacement clips for candidate insertion points. The application of constraints ensures that any resulting virtual placements are suitable for the candidate insertion points at which the virtual products or brands are "inserted." Replacement clips containing virtual products or branding can be generated automatically without generating or storing modified copies of the video title.

The techniques disclosed herein can be applied to an entire catalog of videos, a subset/group of video files, a single video title, or to video segments within a single video title. An example will be instructive.

Figure 1B:
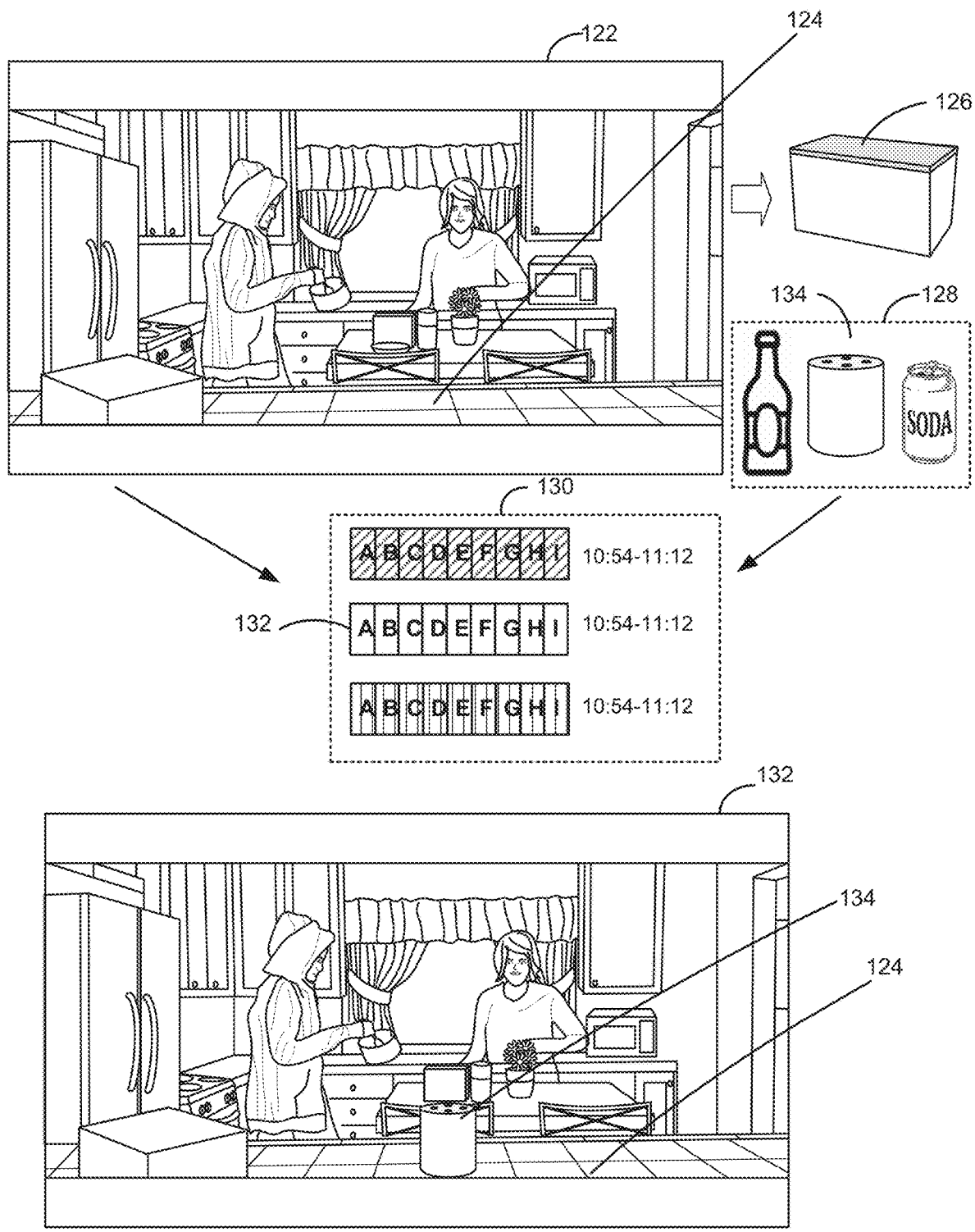
Figure 1C:
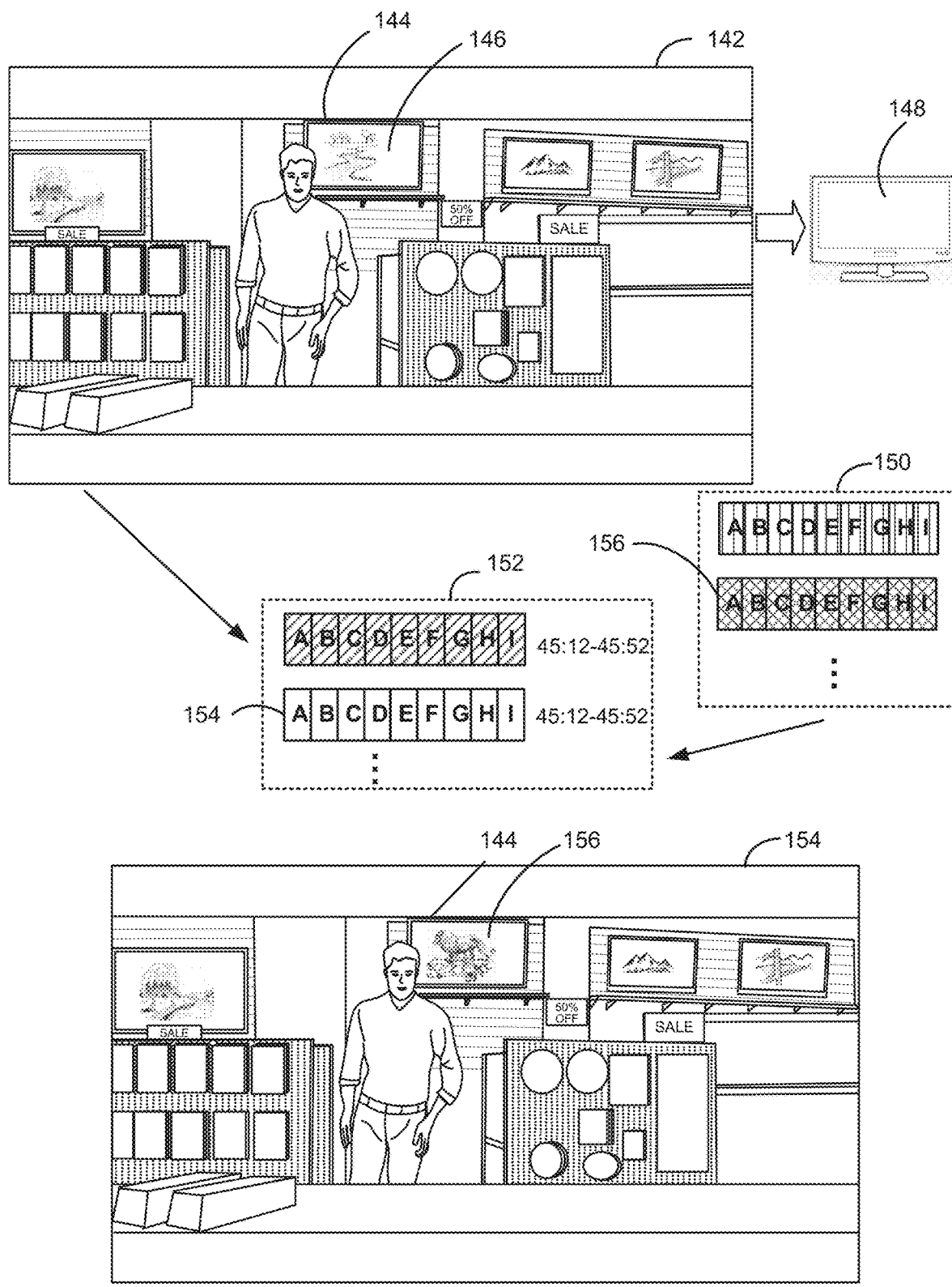

FIGS. 1A-1C illustrate examples of replacement clip generation as enabled by the present disclosure. FIG. 1A shows a representative frame of clip 102, which corresponds to a movie scene. In clip 102, a man is handling a box 104 that is placed on a counter in a store. Box 104 has a vertical surface 106 that contains black and white lettering.

Prior to playback, frames of the movie are analyzed using computer vision and surface 106 of box 104 is identified as a candidate placement 108 for secondary content. More particularly, candidate placement 108 is identified as a vertical surface of a box. A candidate insertion point in the movie is defined by a segment of time corresponding to clip 102 and candidate placement 108. In this example, clip 102 has a start time (00.35) and an end time (01.25).

Information associated with the candidate insertion point and/or associated candidate placement 108 may be stored in association with the movie. The information may include pixel information associated with frames of clip 102 that define candidate placement 108. The information may also include contextual information associated with the candidate insertion point. For example, the contextual information may indicate that the location represented in clip 102 is a store.

Replacement media generation is an automated process that generates replacement media clips that contain virtual product placements (VPPs) or branding. During replacement media generation, replacement media generation constraints are applied to ensure that replacement media clips that are generated for the candidate insertion point include suitable virtual product placements or branding. For example, since vertical surface 106 is a flat surface of a box, replacement media generation constraints indicate that two-dimensional static content is suitable for placement on vertical surface 106 of box 104. In other words, since surface 106 is vertical, a representation of a 3D object may not be virtually placed on surface 106.

Secondary content items 110 including two-dimensional static content items are identified. Replacement clips 112 are generated using the original unmodified clip 102 and secondary content items 110. Each of replacement clips 112 is generated using original unmodified clip 102 corresponding to the candidate insertion point and a corresponding one of secondary content items 110. Each replacement clip may be encoded using one or more video codecs. As shown in this example, each replacement clip corresponds to the same segment of time as clip 102 being replaced.

A secondary content item may be referred to as a secondary content "overlay." A secondary content overlay can include secondary content represented on a background that is either transparent or opaque.

A secondary content item can include an image, text, a video, animation, or other form of content. In some instances, a secondary content item can include a representation of a 3D product or 2D branding. In this example, secondary content 110 includes three different logos: Amazon.com, diapers.com, and Zappos.com.

As shown in FIG. 1A, replacement clip 114 is generated using original clip 102 and a secondary content overlay including an Amazon logo. In this example, vertical surface 116 of Amazon box 118 represented in replacement clip 114 contains an Amazon logo, which replaces the text previously shown on vertical surface 106 of box 104 in original clip 102. Since the actor is moving box 104 in the scene, pixel coordinates of candidate placement 108 may vary among frames in replacement clip 114.

At the time of playback, replacement clip 114 is selected based upon characteristics of the user requesting playback and/or the client device of the user. Manifest data is provided to the client device such that replacement clip 114 replaces clip 102.

FIG. 1B shows a representative frame of a movie clip 122 illustrating a kitchen having an empty countertop 124. Candidate placement 126 is identified as a countertop in a kitchen. Information associated with the candidate insertion point corresponding to candidate placement 126 identifies a segment of the movie having a start time of 10:54 and an end time of 11:12.

Secondary content items 128 that are suitable for virtual placement on a countertop are identified according to replacement media generation constraints. Specifically, each secondary content item represents a three-dimensional object having a flat surface that is suitable for placement on a kitchen counter. In this example, secondary content items 128 include a beer bottle, a soda can, and an Amazon Echo. Replacement clips 130 are generated using original clip 122 and secondary content items 128. Each replacement clip 130 is the same length and corresponds to the same segment of time.

As shown in FIG. 1B, replacement clip 132 shows an Amazon Echo 134 placed on countertop 124. Throughout the clip, shadows generated by the virtually placed Amazon Echo may be replicated as the actors move within the kitchen. Therefore, a representation of a three-dimensional object may be virtually inserted into a scene while simulating shadows and lighting effects that would be generated via a real-world physical 3D object.

FIG. 1C shows a representative frame of a movie clip 142 in which a television 144 is hanging on the wall of a store. Within clip 142, an episode of a television show is playing on screen 146 of television 144. During analysis of frames of the movie, a candidate placement 146 corresponding to screen 146 of television 144 is identified. Information associated with a corresponding insertion point of the movie is stored, where the information identifies a start time of clip 142 (45:12) and indicates a duration of 40 seconds. In addition, the information identifies candidate placement 146 as a screen of a television in a store. The information also indicates a mood of clip 142 as somber.

Replacement media generation constraints indicate that secondary content for virtual placement on a screen of a television can include video content that is either a movie or a television episode. Secondary content items 150 including a plurality of secondary content clips 150 are identified and replacement media clips 152 are generated using clip 142 and secondary content items 150.

In replacement clip 154, television 144 is playing a video 156 that has been virtually "inserted" in clip 142 through the use of a secondary content overlay. Through use of a secondary content overlay, it is possible to facilitate VPP through the virtual insertion of frames of secondary video content into frames of a clip of a video content item.

Figure 2:
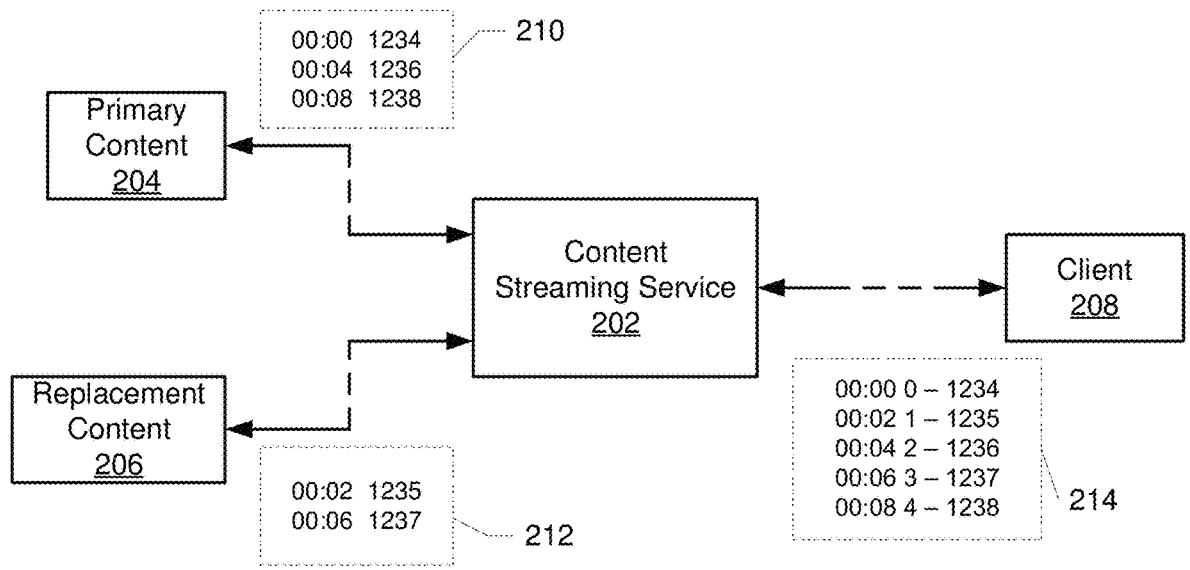
FIG. 2 illustrates an example in which a client device consumes content including replacement clips as enabled by the present disclosure.

FIG. 2 illustrates an example in which a client device consumes content as enabled by the present disclosure. FIG. 2 shows a content streaming service 202 that obtains content fragments and metadata for the clips of primary content 204 corresponding to a media content item and replacement clip(s) of replacement content 206, and provides manifest data to a media player (not shown) on client device 108 so that client device 208 can generate requests for content fragments of the primary content 204 and replacement content 206. Note that the clips of primary content 204 for which manifest data is provided to client device 208 do not include fragments corresponding to all segments of the media content item. Rather, for segments of time associated with corresponding candidate insertion points, replacement clips of replacement content 206 are provided. Generally, a single replacement clip will be provided for a candidate insertion point. However, it is also possible to provide more than one replacement clip having the same combined duration as the duration of a given candidate insertion point.

Fragments of primary content 204 provided to client device 208, represented by dashed box 210, have indices 1234 1236, and 1238 with corresponding media time stamps of 00:00 00:04, and 00:08, respectively. Fragments of replacement content 206 provided to client device 208 106 (represented by dashed box 212) have indices 1235 and 1237, having media time stamps of 00:02, and 00:06, respectively. Note that because the fragments of primary content 204 and replacement content 206 together represent source content for a single content item, they reference a common timeline. However, because they are independently encoded and packaged, their media time stamps may not align, and their indices may be completely unrelated. Alternatively, in some implementations, the media time stamps and indices associated with replacement clips may be the same as those of the corresponding clips of primary content that they have replaced.

Content streaming service 202 provides manifest data (represented by dashed box 214) to client device 208 that includes fragment references corresponding to the fragments of primary content 204 and fragments of replacement content 206 for pertinent replacement clips. Using this manifest data, the player on client device 208 generates content fragment requests that correspond to content fragments of primary content 204 and begins consuming that content stream. As playback continues, the player on client device 208 generates content fragment requests that corresponds to fragments of replacement content 206 for those segments that have been replaced with system-generated replacement clips. As illustrated in dashed box 214, service 202 may use fragment indices 0, 1, 2, 3, and 4. In this manner, fragments of primary content 204 and replacement content 206 originating from two different sources may be seamlessly stitched together.

As shown in this example, manifest data (represented by dashed box 214) includes references to fragments originating from primary content 204 and from replacement content 206. Fragment indices assigned by service 204 reflect the order in which the fragments are to be played by client device 208. As shown in this example, clips of replacement content 206 correspond to segments of time for which original content fragments of the media content item are not provided. Fragment indices may be assigned based on time stamps associated with the respective fragments. The media player of client device 206 may play back the fragments in the order determined by the fragment indices according to the streaming protocol being used (e.g., DASH, Smooth Streaming, or HLS), and consumption of the content continues, with the player seamlessly requesting fragments of primary content 204 and replacement content 206. In this way, the switch between primary content 204 and replacement content 206 is effectively transparent to the player on client device 208.

Figure 3:
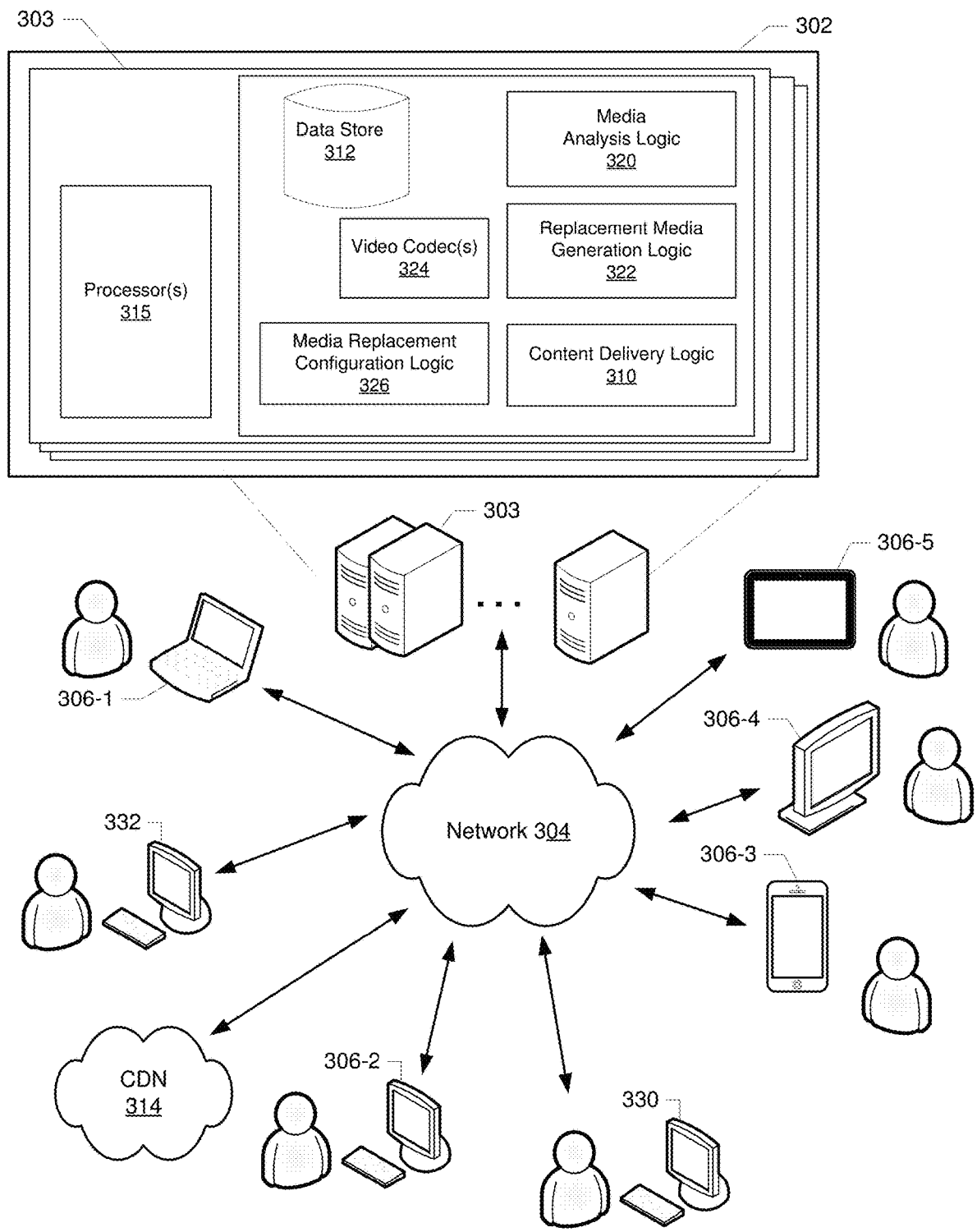
FIG. 3 depicts an example of a computing environment in which implementations enabled by the present disclosure may be practiced.

FIG. 3 illustrates an example of a computing environment in which a video content service 302 provides streaming content (e.g., video and/or audio) via network 304 to a variety of client devices (306-1 through 306-5) in accordance with the techniques described herein. Content service 302 may conform to any of a wide variety of architectures such as, for example, a services platform deployed at one or more co-locations, each implemented with one or more servers 303. Servers 303 can include one or more processors 315, memory, and other hardware for performing the tasks disclosed herein. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and consuming streaming content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 302 is described as if it is integrated with or includes the platform(s) that provides primary content and secondary replacement content to client devices, as well as supports the stitching of content as enabled by the present disclosure. However, it will be understood that content service 302 may provide access to primary and/or secondary replacement content in conjunction with one or more content delivery networks (e.g., CDN 314) that may or may not be independent of content service 302. In addition, the source(s) of one or both of the primary content and the replacement content may be independent of or integrated to various degrees with content service 302. Implementations are contemplated in which content may be stitched and/or encoded, and/or metadata manipulated by a service that is integrated with a content service (e.g., 302), by a service associated with the content provider, or as a third-party service. The range of variations known to those of skill in the art are contemplated to be within the scope of this disclosure.

Content service 302 includes content delivery logic 310 that facilitates at least some aspects of content delivery to client devices 306. In some implementations, content delivery logic 310 facilitates the stitching of primary and replacement content streams as enabled by the present disclosure. In addition, content delivery logic 310 includes a personalization engine that selects one or more replacement clips based, at least in part, on preferences of a user of a client device, characteristics of the user, characteristics of the client device, attributes of replacement clips available in a repository of replacement content, and/or attributes of original segments of media content corresponding to candidate insertion points.

Content service 302 may also include media analysis logic 320 configured to analyze media content items and store attributes of the media content items resulting from the analysis in a knowledge base maintained in data store 312. Content service 302 may also include replacement media generation logic 322 that facilitates the generation of replacement clips using secondary content, unmodified clips of primary content, and the attributes of the of the unmodified clips of primary content. Content service 302 can also further include one or more video codecs 324, which may be used to encode replacement clip(s) at one or more quality levels.

Content service 302 may further include media replacement configuration logic 326 that facilitates the configuration of replacement media configuration constraints, which may be used to guide replacement media generation logic 322. Media replacement configuration logic 326 may provide configuration services via network 104 to client devices 330, 332 of providers of primary content and secondary content, respectively.

Content service 302 may also include a variety of information related to primary content, secondary content used to generate replacement content including replacement clips, and replacement content. The information can include video content, associated metadata, and manifests in data store 312 to which service 302 provides access. Alternatively, such information associated with and/or about the content, as well as the content itself may be provided and/or hosted by one or more separate platforms, e.g., CDN 314 or remote cloud storage. It should be noted that, while logic 310, 320, 322, and 326, and data store 312 are shown as integrated with content service 302, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 4:
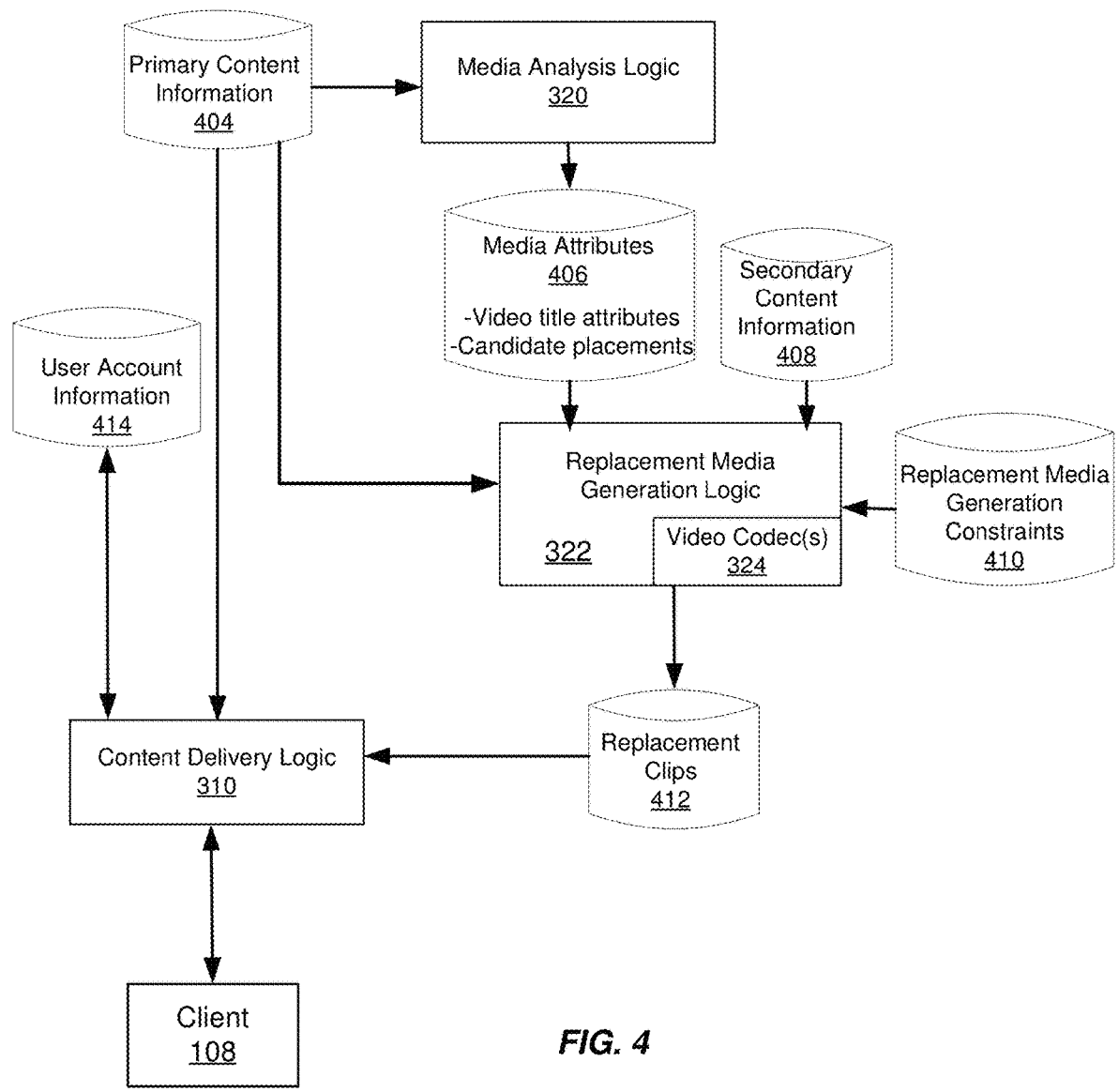
FIG. 4 is a block diagram of an implementation of a content delivery system as enabled by the present disclosure.

FIG. 4 is a block diagram of an implementation of a content delivery system as enabled by the present disclosure. Media analysis logic 320 accesses primary content information 404, which it uses to generate or update media attributes 406 associated with primary content. Primary content information 404 can include media content files associated with media content items such as video content items. Specifically, primary content information 404 can include, for each video title of a video content library, a video content item including one or more video files containing video content. For example, a video content item can include a movie or episode of a television show. In addition, primary content information 404 can include additional data and/or metadata associated with media content items. Additional data and/or metadata can include, but is not limited to, biographies, filmographies, facts, trivia, character backstories, photo galleries, additional related video content, and/or customer reviews.

In some implementations, media analysis logic 320 applies a set of algorithms including machine learning (ML) algorithms and/or computer vision techniques to aid in the analysis of primary content information 404. More particularly, computer vision techniques may be applied to identify attributes pertaining to a title and/or specific scenes within the corresponding video content item. For example, computer vision techniques can be applied to frames of a video content item to identify and/or categorize objects within scenes, identify surfaces of objects on which secondary content can be "placed," and/or ascertain characteristics of objects at the pixel level.

An object can be categorized as a particular type of object such as a wall, billboard, television screen, or counter. An object categorization can also include an identification of a setting location of the object such as a store or kitchen. For example, an object may be classified as a store counter or a kitchen counter. In some implementations, the object may be classified as a 3D or 2D object.

Computer vision techniques can also facilitate the analysis pertaining to a context of a scene. For example, the brightness of a scene or the type of colors in a scene can indicate the mood of the scene.

Media analysis logic 320 may also analyze audio information of a video content item. The audio information can include audio data and/or audio metadata. For example, music played during the video content item, song lyrics, a title of a song played during the video content item, loudness of a sound, speed, and/or tenor of music or sounds in a video title can indicate contextual information such as a mood of a scene.

For a given title, clips corresponding to candidate insertion points may be scored according to a set of scoring algorithms, where each candidate insertion point clip includes a representation of an object or associated object surface on which secondary content can be virtually placed. For example, the clip can correspond to a scene in a movie. Candidate insertion points at which segments of a video content item can be replaced with a corresponding replacement clip may be selected based, at least in part, on the scores.

Information generated and/or aggregated by media analysis logic 320 may be stored as media attributes 406. Media attributes 406 can include, for a given title, title level, clip/scene level, frame level, object level, and/or pixel level attributes. Media attributes can also indicate relationships between and among objects. In addition, media attributes can indicate similarity between clips/scenes.

Media attributes 406 can include, for a given title, attributes for one or more clips within the title. A clip can correspond to a scene or portion thereof. Attributes for a given clip can include, but are not limited to, a duration of the clip, a start time of the clip, an end time of the clip, a categorization of object(s) within the clip (e.g., desk, bus, empty wall), a location (e.g., frame and coordinates) of object(s) within the clip, information identifying surface(s) of object(s) within the clip, attributes of the objects (e.g., size, coordinates, pixel information such as texture and color, relative size in comparison to frame size), and/or attributes of surfaces of objects (e.g., size, relative size in comparison to frame size, coordinates, angle, pixel information such as texture and color). Attributes of an object can include 3D information such as depth of the object, orientation of the object, and/or position of the object. Attributes of an object or associated surface can also indicate proximity of the object/surface to action represented in the clip (e.g., background/foreground). Clip attributes can also include a score and/or ranking assigned to the clip.

Attributes of a clip can also include information pertaining to a context of the clip. For example, the attributes of a clip can include a mood or emotional tone of the clip (e.g., anticipation, disgust, amusement, sadness), a genre/sub-genre associated with the clip (e.g., suspense, historical, romance, drama), a topic of the clip (e.g., crime, break out), a setting time associated with the clip (e.g., 1800s, 2000s, 2010s, future, time of day), a setting location of the clip (e.g., office, kitchen, street), a maturity age rating associated with the clip (e.g., 12+, 16+, 18+), a mature content descriptor associated with the clip (e.g., nudity, sexuality, violence), a country associated with the clip or represented in the clip, an existing product placement in the clip, an audio language of the clip (e.g., English, French, Hindi), identities of cast (actors or other individuals) represented in the clip, and/or facts or trivia associated with the clip. Additional media attributes can include title-level attributes such as consumer ratings, consumer reviews, public recognition of the video title (e.g., awards, box office winner), and/or a production style (e.g., short film, mini-series, pace-fast).

In some implementations, media attributes 406 include information associated with candidate placements that have been identified. A candidate placement can include a categorization of an object represented with a clip and an identification of a surface of the object that is suitable for positioning of a "virtual" placement. Information associated with a candidate placement can further include attributes of the candidate placement, a score and/or a ranking. Attributes of a candidate placement can include attributes of object(s) on which secondary content can be "placed" (e.g., categorization, relative size of the object relative to other content, pixel coordinates, etc.) and/or attribute(s) surface(s) on which the secondary content can be "placed" (e.g., whether the surface is vertical or horizontal, whether the surface is flat or curved, relative size of the surface, etc.). Attributes of a candidate placement can further include a duration of time that the candidate placement is visible on screen, a type of placement (e.g., billboard, signage, 2D object, 3D object, video), relative size of the placement, and/or proximity to action (e.g. background/foreground).

Media attributes 406 can identity and/or define candidate insertion points within a title or specific scene of a title. A candidate insertion point may be defined by information such as a start time of a clip within the corresponding video content item, a duration of the clip, and attributes of a candidate placement within the clip. The clip may correspond to a scene or portion thereof. The information associated with a candidate insertion point may further include a score assigned to the candidate insertion point or pertinent clip.

In some implementations, input may be submitted by a human moderator (not shown to simplify illustration) to facilitate the generation of media attributes 406. In some instances, a set of training data includes a set of annotations associated with a video content item. The set of training data can be used to generate a machine learning model and/or computer vision algorithm, as described herein. Input can also include a modification of media attributes 406.

As shown in FIG. 4, replacement media generation logic 322 uses primary content information 404, media attributes 406, secondary content information 408, and replacement media generation constraints 410 to generate replacement clips 412. Replacement media generation logic 322 may encode each replacement clip at one or more quality levels using corresponding video codec(s) 324. In this manner, replacement media generation logic 322 may generate replacement clips 412 of media content items of a media content library.

For a given media content item, replacement media generation logic 322 identifies one or more candidate insertion points using media attributes 406 associated with the media content item. Metadata marking the start time of a candidate insertion point may be stored in association with the media content item. When a client device requests the media content item, the metadata may be recognized as an insertion point and a replacement clip may be selected for the client device.

For a given insertion point, replacement media generation logic 322 identifies a pertinent clip of the media content item from primary content information 404. Specifically, replacement media generation logic 322 may retrieve the clip corresponding to the start time of the insertion point.

Replacement media generation logic 322 uses secondary content information 408 and replacement media generation constraints 410 in combination with the retrieved clip to generate one or more corresponding replacement clips 412. In some implementations, replacement media generation logic 322 selects one or more secondary content items from secondary content information 408 that are suitable for "insertion" at the candidate insertion point using media attributes 406, attributes of secondary content items (from secondary content information 408), and replacement media generation constraints 410 to select the secondary content item(s) that it will use to generate replacement clip(s) for the candidate insertion point.

Secondary content information 408 can include a plurality of secondary content items. A secondary content item can include static content or dynamic content. In addition, a secondary content item can include 2D or 3D content. Examples of static, two-dimensional content include an image and alphanumeric characters such as a brand or logo. Dynamic content can include, for example, a video corresponding to a television episode or movie. 3D content can include a representation of a physical object such as a beer bottle, speaker, or automobile.

A secondary content item may be referred to as an overlay. An overlay can include a single frame or a sequence of frames. An overlay can include a background that is transparent or solid.

Secondary content information 408 can also include metadata that indicates attributes of the secondary content items. For example, the attributes of a secondary content item can include, but are not limited to, a name of an object (e.g. product name) represented within the secondary content item, a category or type of the object (e.g., beverage, soft drink, alcoholic drink, wine, furniture, cosmetics, video content, etc.), a brand of the object, a country of manufacture of the object, a geographic region or location in which the object can be purchased, and/or attributes of individuals (e.g., consumers) to whom the secondary content item is targeted (e.g., adults over 21, women, golfers). Attributes of a secondary content item can also include a uniform resource locator (URL), hypertext link, address, and/or other information corresponding to a location from which the object can be purchased or otherwise obtained.

Replacement media generation constraints 410 may include rules that can be used to match secondary content items with candidate insertion points of media content items. More particularly, the rules may include or be used to generate a "mapping" between compatible scene types (e.g., kitchen counter in comedy, billboard outside in drama) and attributes of compatible secondary content (e.g., product type, product category, brand). Constraints 410 can specify secondary content items (or associated attributes) that are permitted (or, conversely, not permitted) to be "placed" in primary content. For example, the primary content can include a specific media item, a specific clip/scene, or a specific candidate placement. As another example, the primary content may be a video title, clip, or candidate placement having specific attributes. Similarly, constraints 410 can specify or indicate primary content (e.g., specific media content item, specific clip, specific candidate placement, and/or associated attributes) that is permitted (or, conversely, not permitted) to include specific secondary content or secondary content having specific attributes. As will be described in further detail below with reference to FIG. 5, in some implementations, media generation constraints 410 may be configurable via a primary content provider of media content item(s) and/or a secondary content provider of secondary content.

Client device 108 can request a media content item from content delivery logic 310. Content delivery logic 310 may access a user account associated with client device 108 from user account information 414. A user account may also be referred to as a user profile or account profile. User account information 414 may indicate whether the user of client device 108 has opted out of advertising or virtual object placement. In addition, user account information 414 may indicate attributes of the user. The attributes of the user may include those that have been explicitly provided by the user, as well as those that have been determined based upon the user's online activities. For example, the attributes of the user may identify prior online purchases or other information pertaining to prior purchases, viewing history of media content items, previous click history in relation to advertisements or other content provided to the user, a location of the user, and/or other demographics.

If user account information 414 indicates that a user of the corresponding account has opted out of advertising or virtual object placements, content delivery logic 310 delivers the requested media content item unmodified. However, if user account information 414 indicates that the user has not opted out of advertising or virtual object placements, content delivery logic 310 attempts to identify a suitable replacement clip from replacement clips 412 for each candidate insertion point of the media content item based, at least in part, on user account information.

Content delivery logic 310 may generate manifest data including references to only a subset of fragments of the original media content item. Specifically, the manifest data may exclude references to fragments of the media content item that correspond to candidate insertion points. Instead, manifest data may include references to fragments of the selected replacement clip(s) for the candidate insertion point(s). Content delivery logic 310 may transmit the manifest data to client device 108, enabling client device 108 to request fragments of content while providing client device 108 with a seamless playback experience.

Figure 5:
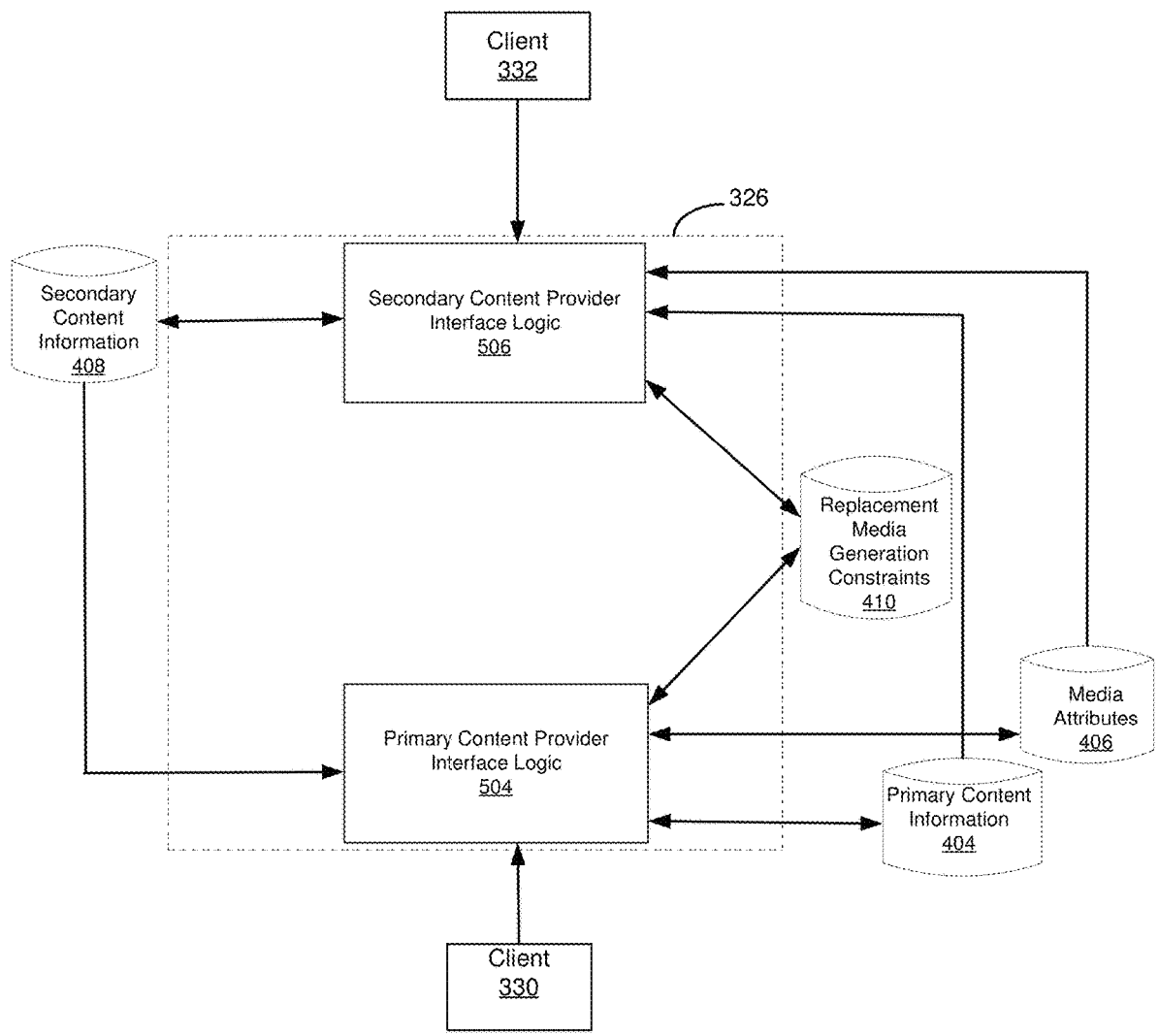
FIG. 5 is a block diagram of an implementation of a configuration service enabled by the present disclosure.

FIG. 5 is a block diagram of an implementation of a configuration service 502 enabled by the present disclosure. Configuration service 502 may include primary content provider interface logic 504 that enables replacement media generation constraints 410 to be generated or updated by a provider of primary content via client device 330. For example, primary content provider interface logic 504 may provide a graphical user interface (GUI) that may be rendered via client device 330 of a primary content provider. A primary content provider may submit a request to update replacement media generation constraints 410 with information identifying or indicating secondary content that is permitted to be virtually placed in a primary content item. Similarly, a primary content provider may update replacement media generation constraints 410 to identify or indicate secondary content that is prohibited from being virtually placed in a primary content item. Primary content provider interface logic 504 may also enable a primary content provider to upload primary content including video content items for storage in primary content information 404 or remove primary content from primary content information 404.

In addition, primary content provider interface logic may enable a primary content provider to modify media attributes 406 associated with a media content item. For example, a primary content provider may choose to tag a scene with a mood of sad rather than happy.

In some implementations, primary content provider interface logic 504 enables primary content providers to review information pertaining to candidate insertion points that have been identified for media content items. For example, primary content provider interface logic 504 may provide information pertaining to attributes of candidate insertion point(s) associated with a media content item for presentation via a GUI. The information can include scores assigned to candidate insertion points and/or associated rankings. In addition, an image or clip associated with a candidate insertion point may be rendered, enabling a primary content provider to visually review the exact placement of a candidate insertion point within a scene. A primary content provider may confirm a candidate insertion point associated with media content item, remove a candidate insertion point, or add a candidate insertion point. A primary content provider may also modify attributes of a candidate insertion point. For example, a primary content provider may modify the attributes of a candidate insertion point to clarify that the candidate insertion point should contain video content where the candidate insertion point is a television screen.

Similarly, configuration service 502 may include secondary content provider interface logic 506 that enables replacement media generation constraints 410 to be generated or updated by a provider of secondary content via client device 332. Secondary content provider interface logic 506 may provide a graphical user interface (GUI) that may be rendered via client device 332 of a secondary content provider. A secondary content provider may submit a request to update replacement media generation constraints 410 with information identifying or indicating primary content in which a secondary content item is permitted to be virtually placed. Similarly, a secondary content provider may update replacement media generation constraints 410 to identify or indicate primary content in which a secondary content item is prohibited from being virtually placed. Secondary content provider interface logic 506 may also enable a secondary content provider to upload secondary content for storage in secondary content information 408 or remove secondary content from secondary content information 408.

In some implementations, configuration service 502 enables content providers to preview replacement clips that might be provided to viewers who choose to watch primary content items via system 302. A preview clip represents a replacement clip in which an object represented in secondary content has been virtually placed at a candidate placement, identified in media attributes 406, in a corresponding clip of primary content. A preview of a replacement clip may be generated using secondary content information 408 such as a secondary content overlay corresponding to a secondary content item and an unmodified clip of primary content retrieved from primary content information 404. A primary or secondary content provider can choose to submit or modify replacement media generation constraints 410 accordingly.

In the following description, examples are described with reference to a single video. However, it is important to note that these examples are merely illustrative. Therefore, the described implementations may also be applied to multiple videos.

Figure 6:
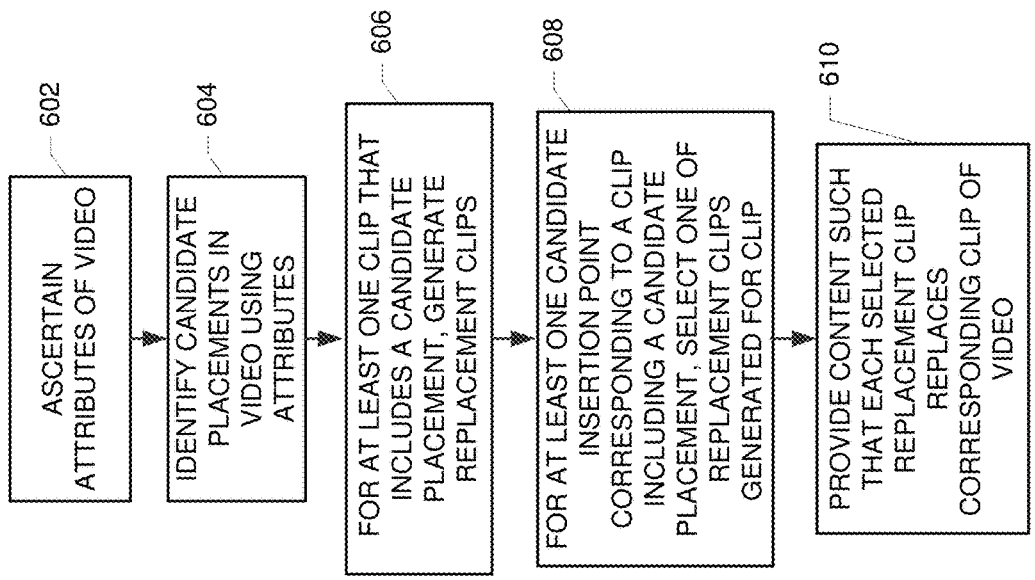
FIG. 6 is a flow diagram illustrating operation of a particular implementation enabled by the present disclosure.

FIG. 6 is a flow diagram illustrating operation of a particular implementation enabled by the present disclosure. As shown in FIG. 6, attributes of a video are ascertained (602). For example, the video may correspond to a video title of a video library. As described above, attributes of a video can include information pertaining to individual clips of the video. More particularly, the attributes of a video can identify, for each of the clips, objects represented within the clip. For example, the attributes for a first clip of the media content item may include an identification of a first object represented in the first clip. The attributes of a video can also include information pertaining more generally to the video title. The attributes may be ascertained via attribute generation or querying media attributes stored in a data store. An example implementation of attribute generation will be described in further detail below with reference to FIG. 7.

Candidate placements in the media content item may be identified using the attributes (604). Each candidate placement may correspond to a surface of an object represented in one of the clips. For example, a first candidate placement may correspond to a surface of a first object represented in the first clip. In some instances, a clip may contain no candidate placements. Other clips may contain one or more candidate placements. The number of candidate placements identified for a given video may vary substantially based, at least in part, on the associated attributes. An example implementation of candidate placement identification will be described in further detail below with reference to FIG. 8.

A plurality of replacement clips may be generated for at least one clip that includes a candidate placement (606). For example, for a first clip that includes a first candidate placement, each replacement clip may be generated using a secondary content item of a plurality of secondary content items and the first clip. Once generated, each replacement clip may include a representation of a corresponding secondary content item or portion thereof positioned at the first candidate placement. More particularly, for a first secondary content item including secondary content, a first replacement clip generated using the first secondary content item may include a representation of the secondary content positioned at the first candidate placement. Replacement clip generation may be performed according to constraints such as general constraints and/content provider constraints (e.g., constraints of a provider of the video and/or secondary content item). Specifically, the constraints may be used to match suitable secondary content items with candidate placements. If there is not a suitable secondary content item match for a candidate placement, no replacement clips may be generated for that candidate placement/clip.

Secondary content items may be selected for generation of replacement clips based, at least in part, on input submitted by secondary content providers. In some instances, the input submitted by a secondary content provider may include a selection of a particular candidate placement or associated clip (e.g., scene) for virtual placement of a particular secondary content item. For example, a secondary content provider may submit a bid for a particular candidate placement or a direct purchase of a particular candidate placement. Alternatively, a secondary content provider may submit a bid for virtual placement of a particular secondary content item without specifying a particular candidate placement. The input (e.g., bid) may be submitted in association with a corresponding set of replacement media generation constraints, which can identify or otherwise indicate acceptable attributes of primary content (e.g., attributes of clips/scenes and candidate placements) in which secondary content of the secondary content item can be virtually placed. Secondary content items may be selected based, at least in part, on bids submitted by secondary content providers within the constraints that have been established.

For at least one candidate insertion point corresponding to a clip including a candidate placement, one of the replacement clips generated for the clip may be selected (608). A replacement clip may be selected for a particular class of users, a particular client device, and/or a particular user. In some implementations, a replacement clip is selected at the time of playback of the video. For example, playback of the video may be initiated responsive to a request received from a client device. An example implementation of replacement clip selection will be described in further detail below with reference to FIG. 9.

The video may be streamed to the client device such that the selected replacement clips are provided in place of corresponding clips of the video (610). More particularly, where one or more replacement clips have been selected, only a subset of the clips is provided. An example implementation of content delivery will be described in further detail below with reference to FIG. 10.

Figure 7:
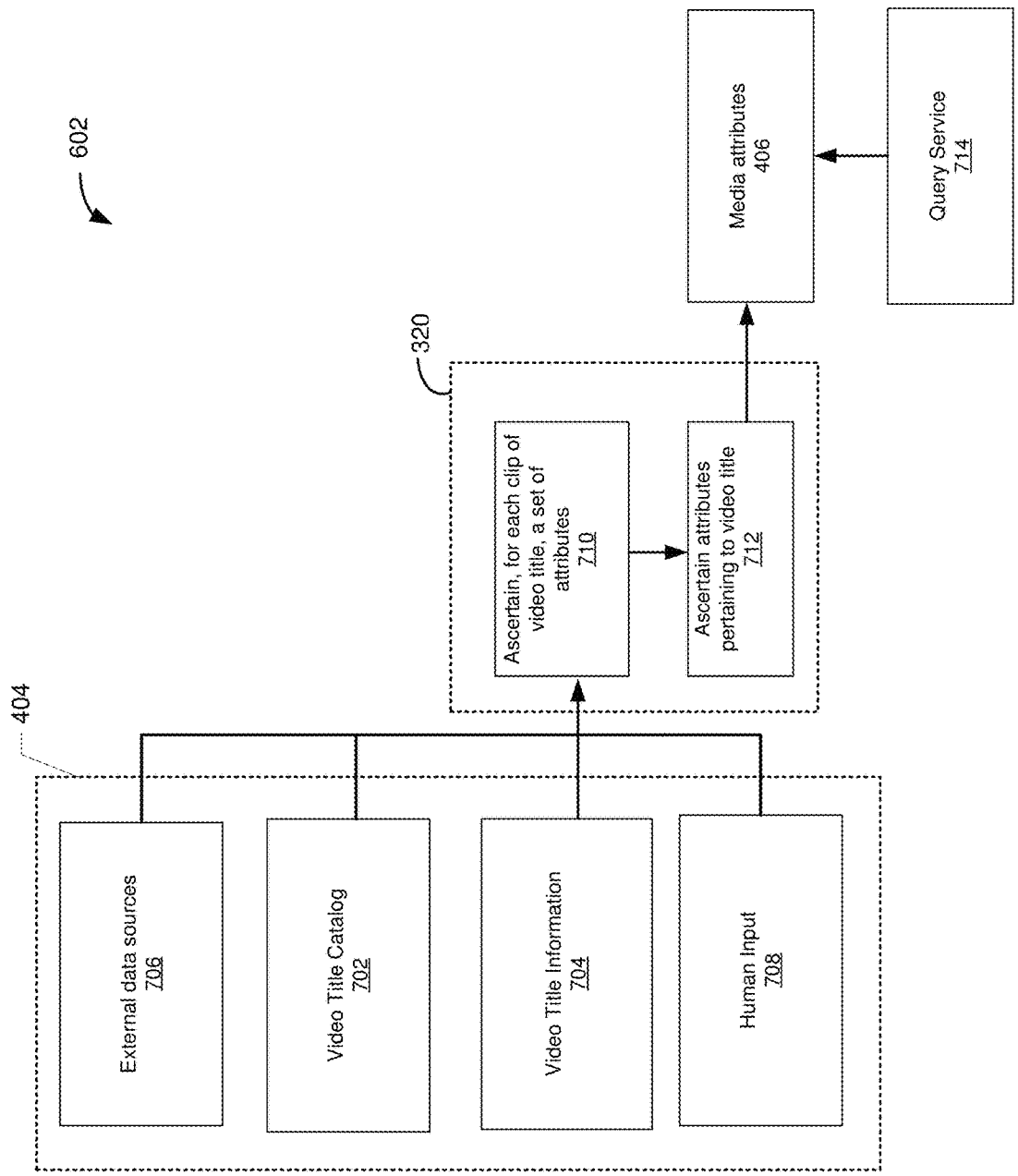
FIG. 7 is a diagram illustrating an example of an implementation of media attribute generation as enabled by the present disclosure.

FIG. 7 is a diagram illustrating an example of an implementation of media attribute generation as enabled by the present disclosure. Primary content information 404 may be accessed from one or more data stores. As shown in this example, primary content information 404 may include a video title catalog 702, which includes video files for various video titles. Primary content information 404 may also include video title information 704 associated with video titles such as trivia, facts, and/or cast information. Additional video title information such as reviews of video titles may be retrieved from external data sources 706.

In some implementations, human input 708 may be submitted to moderate and/or annotate results of media analysis logic 320. For example, a human may moderate and/or annotate media attributes 406 such as attributes of video titles generated and/or collected by media analysis logic 302 from video title catalog 702, video title information 704, and external data sources 706.

Media analysis logic 320 may ascertain for each clip (e.g., scene) of a video title, a set of attributes, as shown at 710. Media analysis logic 320 may analyze video information and/or audio information associated with each clip. In some implementations, media analysis logic applies one or more computer vision techniques to frames of each video title. Example computer vision techniques include, but are not limited to, image classification, object detection, object tracking, semantic segmentation, and/or instance segmentation.

In addition, media analysis logic 320 may ascertain, for each video title, attributes that generally pertain to the video title, as shown at 712. For example, attributes of a video title can include box office reception, awards earned by the video title, and/or percentage of positive reviews by viewers of the title.

Media analysis logic 320 may ascertain media attributes including clip-specific attributes and/or video title-related attributes using machine learning techniques. In some implementations, a training data set is used to train a set of machine learning algorithms that may be applied to accurately identify attributes of video clips or associated video titles. For example, a training data set may include human-generated tags identifying attributes pertinent to a corresponding set of training clips or associated video titles. For example, training data may label objects in training clips with object identifiers. As another example, training data may label clips with contextual information such as mood or setting. In this manner, machine learning algorithms may be used in combination with computer vision techniques to accurately detect various objects and/or other media attributes.

Machine learning algorithms used to ascertain media attributes may be automatically updated as new data is collected. This data can include additional attributes that are ascertained, for example, based on analysis of frames of video titles as they are added to video title catalog 702. In addition, the data can include human input that validates (or invalidates) the accuracy of attributes determined via the machine learning algorithms, as well as human input that modifies previously identified attributes of video titles or adds additional attributes to those previously identified.

Attributes of each video title including attributes of each video clip may be stored as media attributes 406 in a data store. Attributes of a clip or video title may be retrieved from media attributes by query service 714. Query service 714 may be accessed, for example, to retrieve media attributes for identification of candidate placements, generation of replacement clips, and/or for media replacement configuration logic 326.

Figure 8:
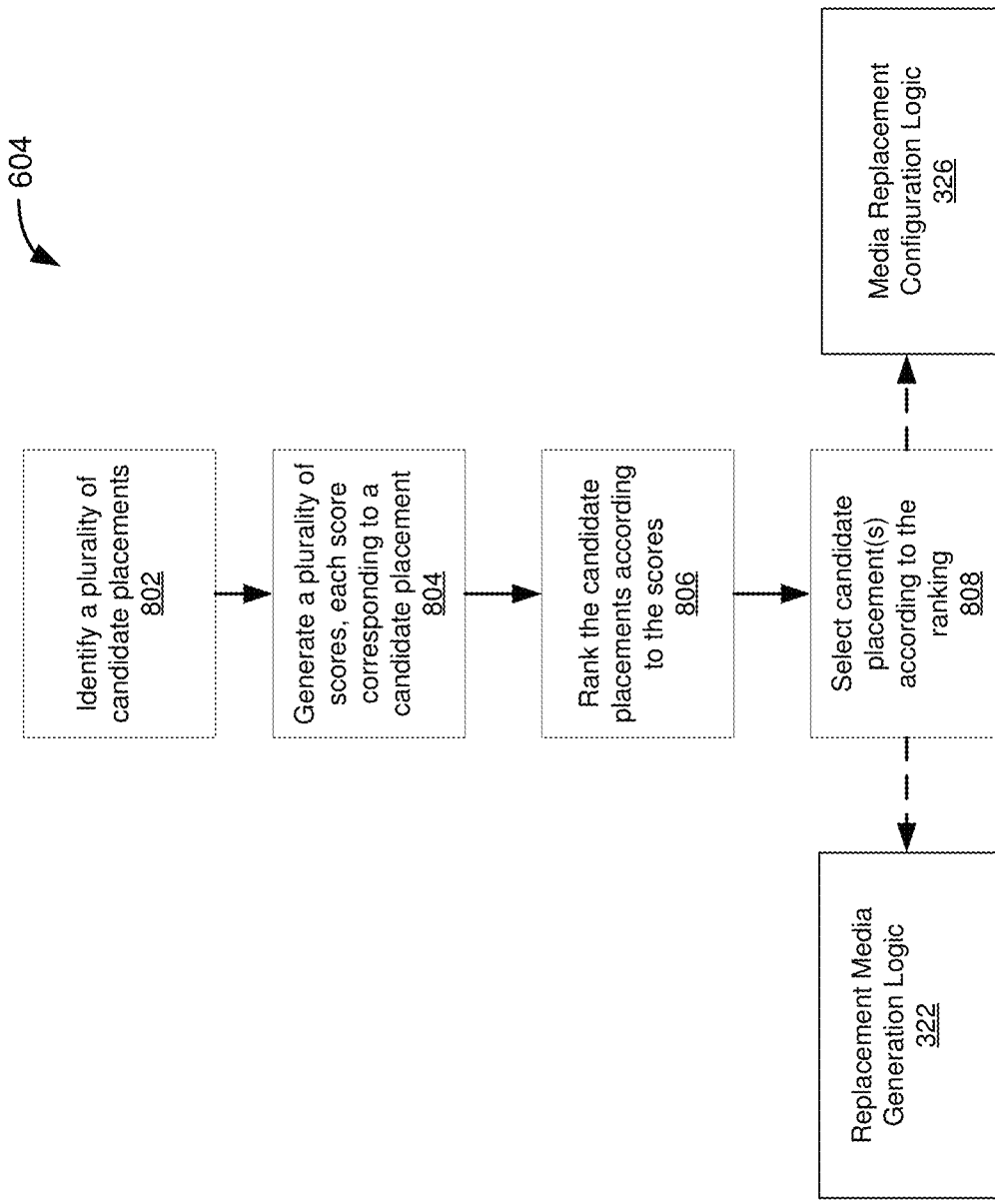
FIG. 8 is a flow diagram illustrating an example of an implementation of candidate placement identification as enabled by the present disclosure.

FIG. 8 is a flow diagram illustrating an example of an implementation of candidate placement identification as enabled by the present disclosure. As shown in FIG. 8, a plurality of candidate placements may be identified using the media attributes of one or more video titles (802). More particularly, the candidate placements may be identified for a plurality of clips, which correspond to one or more video titles. As described above, each candidate placement may correspond to a surface of an object represented within a clip.

The candidate placement identification process may be applied globally for a plurality of video titles. Alternatively, the candidate placement identification process may be applied, repeatedly, for each individual video title.

A plurality of scores may be generated using the attributes, where each score corresponds to a candidate placement or associated clip (804). A higher score may indicate a more valuable candidate placement than another candidate placement having a lower score. For example, a candidate placement having a large size relative to other content in the corresponding clip and that is visible within the foreground of an action scene may have a higher score than another candidate placement that is small in size and visible only in the background of a scene.

Candidate placements may be identified using a set of rules, which can include general rules applicable to all videos, rules that are specific to a content provider of the video, and/or rules that are specific to the video. The rules or portion thereof may be statically configured. In addition, the rules or portion thereof may be generated and/or updated using machine learning techniques.

In some implementations, candidate placements may be identified and/or scored using a machine learning algorithm. More particularly, a training data set may be used to train a set of machine learning algorithms that may be applied to accurately identify candidate placements and/or score candidate placements. For example, a training data set may include human-generated tags identifying attributes associated with human-identified candidate placements in corresponding training clips. As another example, a training data set may include human-generated tags identifying attributes associated with various different classes of human-classified candidate placements such as poor, average, good, and excellent. In this manner, machine learning algorithms may be leveraged to facilitate the detection of candidate placements and/or identification of optimal candidate placements.

Machine learning algorithms used to identify candidate placements may be automatically updated as new data is collected. This data can include candidate placements that are ascertained, for example, based on analysis of frames of video titles as they are added to video title catalog 702. In addition, the data can include human input that validates (or invalidates) the accuracy of candidate placements determined via the machine learning algorithms, adds candidate placements to those previously identified, or modifies attributes of previously identified candidate placements.

The identified candidate placements may be ranked using the scores such that each candidate placement is assigned a ranking (806). In some implementations, one or more of the identified candidate placements may be selected based, at least in part, on the assigned rankings (808).

The media attributes stored in data store 312 may be updated with information associated with candidate placements that have been identified and/or selected. For example, each candidate placement may be identified in association with a corresponding clip. As another example, information including scores and/or rankings associated with candidate placements may be stored.

Each clip containing a candidate placement may be associated with a candidate insertion point in a corresponding video. A candidate insertion point may designate a potential insertion point for a replacement clip. For example, a candidate insertion point may correspond to a start time of the pertinent clip. For a given video, metadata of a corresponding video file may be updated to include a marker that identifies a candidate insertion point within the video.

The candidate placement identification process may be leveraged to select optimal candidate placements for replacement media generation logic 322. For example, clips of a video title or video library may be ranked so that the candidate placements that are most valuable or suitable for virtual placements are selected. Clips containing the selected candidate placements may be used by media generation logic 322 to generate replacement clips.

In addition, the candidate placement identification logic may be used to select candidate placements for use by media replacement configuration logic 326. Media replacement configuration logic 326 may present information pertaining to selected candidate placements to primary and/or secondary content providers via a GUI. For example, media replacement configuration logic 326 may provide access to images or clips that contain candidate placements. As another example, media replacement configuration logic 326 may provide attributes of virtual placements, which may include scores and/or rankings of the virtual placements. Media replacement configuration logic 326 may also use the selected candidate placements to generate and provide example virtual placements using secondary content items.

Figure 9:
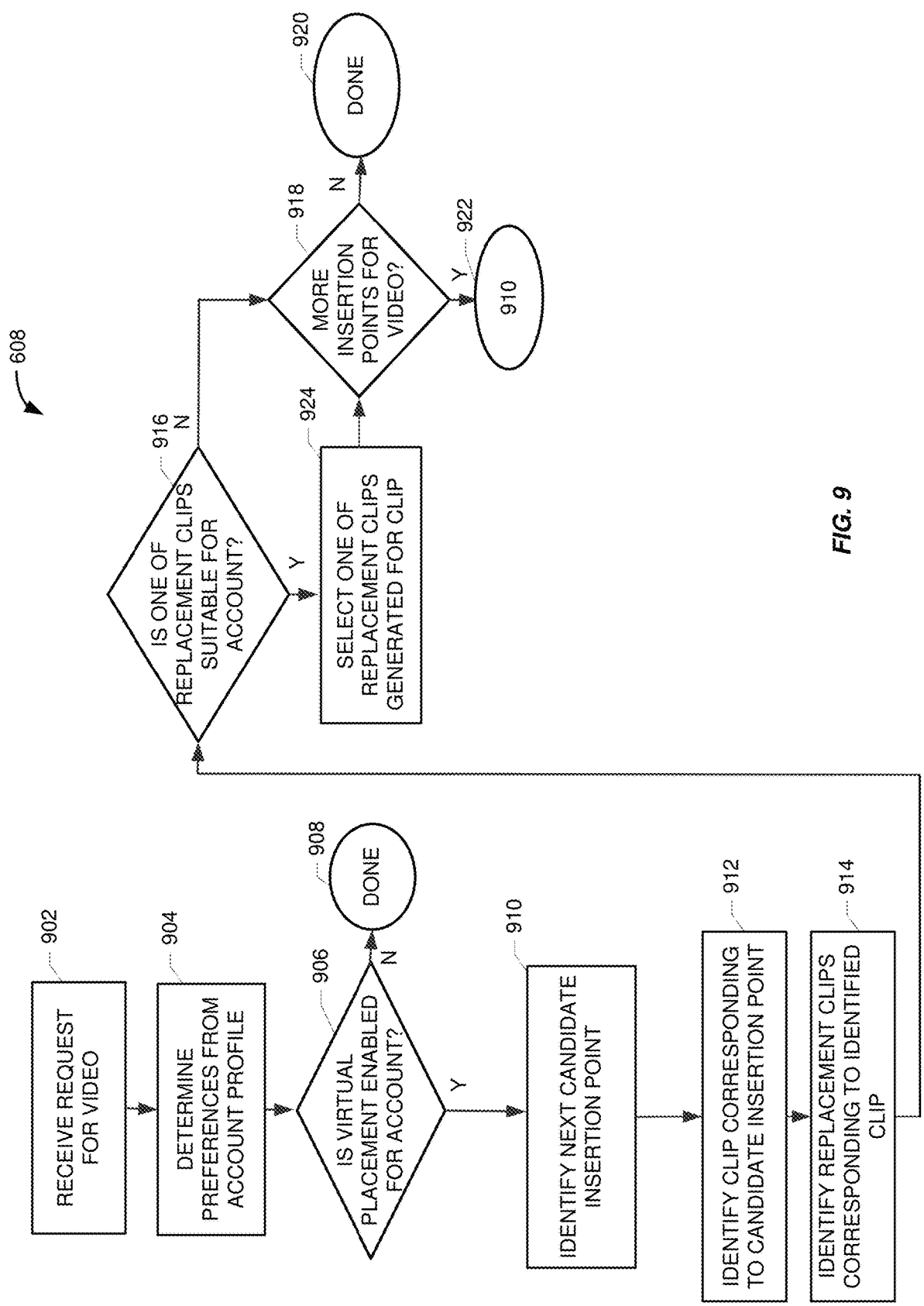
FIG. 9 is a flow diagram illustrating an example of an implementation of replacement clip selection as enabled by the present disclosure.

FIG. 9 is a flow diagram illustrating an example of an implementation of replacement clip selection as enabled by the present disclosure. A replacement clip may be selected at the time of playback. In some implementations, the user may log into a user account and request a video for playback via an on-demand system. For example, a request to initiate playback of a video corresponding to a video title of a video library may be received from the client device (902).

Preferences of the user of the client device may be ascertained from information stored in a user account (904).

For example, the preferences may indicate whether the user has opted in or out of online advertisements and/or virtual video placements such as those enabled by the present disclosure. In other words, the user account may be accessed to determine whether virtual placement is enabled or disabled.

If virtual placement is not enabled for the account (906), the replacement clip selection process ends without selecting replacement clips (908). However, if virtual placement is enabled, the replacement clip selection process continues.

In this example, one or more candidate placements have previously been identified/selected for the video, where each candidate placement corresponds to a clip containing the candidate placement. For each such clip, a corresponding insertion point may be flagged in a video file by metadata, which may also be referred to as a marker.

A next candidate insertion point in the video may be identified using the metadata (910). A clip corresponding to the candidate insertion point may be identified (912). Replacement clips corresponding to the identified clip may then be identified (914).

A replacement clip for the identified clip may be selected based, at least in part, on information stored in the user account. For example, information stored in the account may include characteristics of the user and/or characteristics of the client device. Characteristics of the user can include, but are not limited to, statically configured information such as that submitted by the user, a history of online browsing behavior or purchase transactions of the user, and/or attributes of the user ascertained via machine learning. Characteristics of the client device may also be ascertained via message(s) received from the client device. Characteristics of a client device may include, for example, a type of device, brand of device, model of device, type of display, processor capabilities, and/or bandwidth.

A "personalized" replacement clip may be selected for the candidate insertion point from the replacement clips based, at least in part, on the user account. If a suitable replacement clip cannot be selected for the candidate insertion point (916), the process continues for any further candidate insertion points in the video. It is determined whether there are further candidate insertion points in the video (918). If there are no further candidate insertion points in the video, the replacement clip selection process ends (920). If there are more candidate insertion points in the video, a subsequent candidate insertion point may be identified at 910.

A replacement clip may be selected from the replacement clips based, at least in part, on information in the user account (924). In some implementations, a replacement clip is selected based, at least in part, on other replacement clips previously selected for the video streaming session. For example, if a replacement clip including a representation of a particular soft drink is selected as a replacement for one scene, a replacement clip containing the same soft drink may not be selected for a subsequent scene. Alternatively, replacement clips may be selected for more than one candidate insertion point with an emphasis on repeated exposure to the same product or brand. If there are further candidate insertion points for the video (918), the replacement clip selection process may repeat for subsequent candidate insertion points (910).

While implementations are described with reference to a video-on-demand system, these examples are merely illustrative. Therefore, the disclosed implementations may also be implemented within the context of live streaming.

Figure 10:
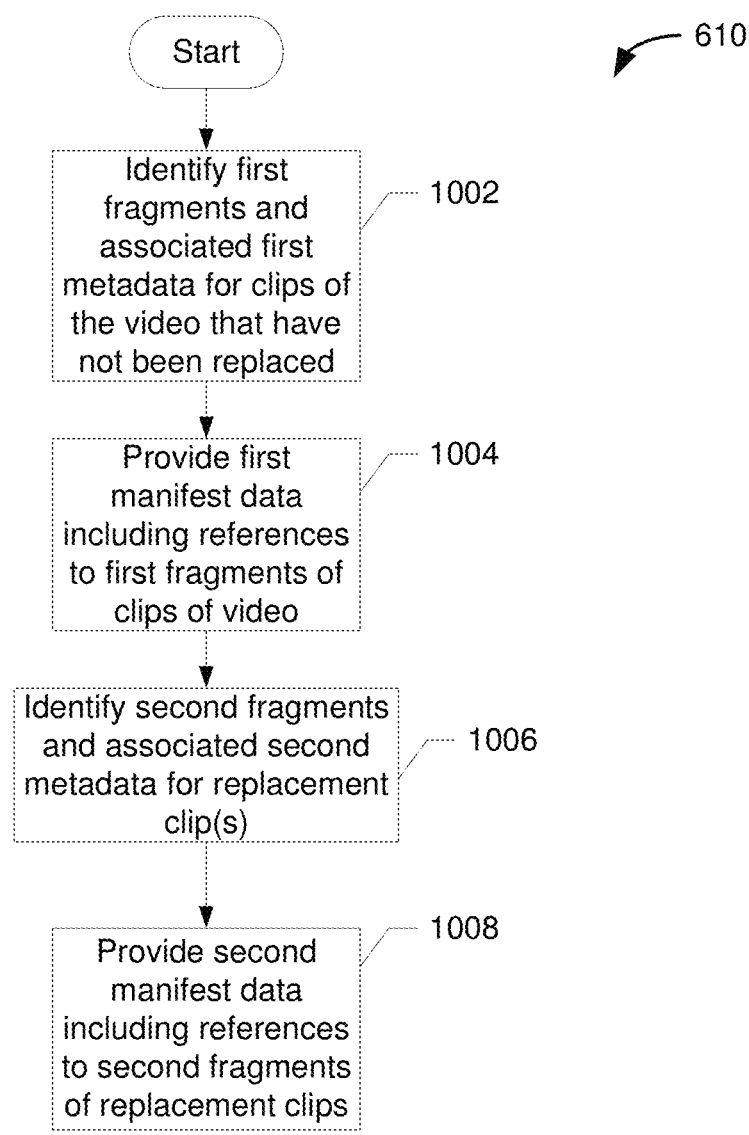
FIG. 10 is a flow diagram illustrating an example of an implementation of content delivery as enabled by the present disclosure.

FIG. 10 is a flow diagram illustrating an example of an implementation of providing content as enabled by the present disclosure. As shown in this example, first fragments and associated first metadata for clips of the video that have not been replaced may be identified (1002). First manifest data including references to the first fragments may be generated using the first metadata and provided to the client device (1004). Similarly, second fragments and associated second metadata for replacement clip(s) may be identified (1006). Second manifest data including references to the second fragments of the replacement clips may be generated using the second metadata and provided to the client device (1008).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
analyzing frames of video content to identify attributes, the attributes including, for a first clip of the video content, a categorization of a first object represented in the first clip;
identifying a first candidate placement using the attributes, the first candidate placement corresponding to a surface of the first object represented in the first clip;
selecting a plurality of secondary content items, wherein the plurality of secondary content items includes a first secondary content item comprising a representation of a second object, wherein selecting the plurality of secondary content items includes selecting the first secondary content item from a repository of secondary content items based, at least in part, on:
attributes of the second object represented in the first secondary content item;
the attributes of the video content; and
a set of rules including a mapping of scene types to attributes of secondary content items based on constraints configurable by a primary content provider specifying primary content attributes permitted to have secondary content item replacement, and constraints configurable by a secondary content provider specifying secondary content attributes permitted to be placed in primary content;
generating a plurality of replacement clips using the first clip and the plurality of secondary content items, each replacement clip including a representation of a corresponding secondary content item of the plurality of secondary content items positioned at the first candidate placement;
processing a request to initiate playback of the video content, the request being received from a client device;
identifying an account profile associated with the client device, wherein the account profile comprises characteristics of a user associated with the account profile;

identifying metadata marking a first candidate insertion point within the video content, the first candidate insertion point corresponding to a start time of the first clip;

selecting a first replacement clip of the plurality of replacement clips based, at least in part, on the account profile; and providing a manifest to the client device, the manifest comprising first manifest data including references to fragments corresponding to a first subset of a plurality of segments of the video content and second manifest data including references to a set of replacement fragments corresponding to the selected first replacement clip, the set of replacement fragments corresponding to a second subset of the plurality of segments of the video content.

2. The method of claim 1, further comprising:

generating a plurality of scores based, at least in part on the attributes, each score corresponding to a candidate placement of a plurality of candidate placements including the first candidate placement, each candidate placement corresponding to a surface of an object represented within a corresponding clip of the video content;

ranking the plurality of candidate placements using the scores such that each candidate placement of the plurality of candidate placements is assigned a ranking; and selecting the first candidate placement based, at least in part, on the ranking assigned to each candidate placement of the plurality of candidate placements.

3. The method of claim 2, the attributes of the video content further comprising one or more of: a size of the first candidate placement relative to other content in the first clip, a duration of the first clip, an emotional tone of the first clip, a genre associated with the first clip, a topic of the first clip, a setting time associated with the first clip, a setting location of the first clip, a maturity age rating associated with the first clip, a mature content descriptor associated with the first clip, a country associated with the first clip, an audio language of the first clip, 3D information indicating a depth of the first object, 3D information indicating an orientation of the first object, 3D information indicating a position of the first object, proximity of the first object to action represented in the first clip, identities of individuals represented in the first clip, facts associated with the first clip, consumer ratings associated with the video content, consumer reviews of the video content, public recognition of the video content, or a production style of the video content.

4. The method of claim 1, a first secondary content item of the plurality of secondary content items including a representation of a second object, the method further comprising:

selecting the plurality of secondary content items, wherein selecting the plurality of secondary content items includes selecting the first secondary content item from a repository of secondary content items based, at least in part, on attributes of the second object represented in the first secondary content item, the attributes of the video content, and a set of rules indicating attributes of the second object that are compatible with the first candidate placement.

5. The method of claim 1, further comprising:

selecting the plurality of secondary content items, wherein selecting the plurality of secondary content items includes selecting a first secondary content item from a repository of secondary content items based, at least in part, on attributes of the first secondary content item and the attributes of the video content, the attributes of the video content further including one or more of: an emotional tone of the first clip, a genre associated with the first clip, a topic of the first clip, a setting time associated with the first clip, a setting location of the first clip, a maturity age rating associated with the first clip, a mature content descriptor associated with the first clip, a country associated with the first clip, an audio language of the first clip, 3D information indicating a depth of the first object, 3D information indicating an orientation of the first object, 3D information indicating a position of the first object, proximity of the first object to action represented in the first clip, identities of individuals represented in the first clip, facts associated with the first clip, consumer ratings associated with the video content, consumer reviews of the video content, public recognition of the video content, or a production style of the video content.

6. A method, comprising:

ascertaining attributes of media content, the attributes including, for a first clip of the media content, an identification of a first object represented in the first clip;

identifying a first candidate placement using the attributes, the first candidate placement corresponding to a surface of the first object represented in the first clip;

selecting a plurality of secondary content items, wherein the plurality of secondary content items includes a first secondary content item comprising a representation of a second object, wherein selecting the plurality of secondary content items includes selecting the first secondary content item from a repository of secondary content items based, at least in part, on attributes of the second object represented in the first secondary content item, the attributes of the media content, and a set of rules including a mapping of scene types to attributes of secondary objects based on constraints configurable by a primary content provider specifying primary content attributes permitted to have secondary content item replacement, and constraints configurable by a secondary content provider specifying secondary content attributes permitted to be placed in primary content;

generating a plurality of replacement clips using the first clip and the plurality of secondary content items, each replacement clip including a representation of a corresponding secondary content item of the plurality of secondary content items positioned at the first candidate placement;

receiving a request for the media content from a client device;

identifying an account profile associated with the client device, wherein the account profile comprises characteristics of a user associated with the account profile;

for a candidate insertion point in the media content, selecting a first replacement clip of the plurality of replacement clips based on the account profile; and providing a manifest to the client device, wherein the manifest comprises first manifest data referring to one or more clips of the media content and second manifest data referring to the first replacement clip.

7. The method of claim 6, further comprising:

selecting the plurality of secondary content items for the first clip from a repository of secondary content based, at least in part, on attributes of the first candidate placement, the attributes of the first candidate placement comprising one or more of: a duration of time that the first candidate placement is visible within the first clip, a placement type, a relative size of the first candidate placement in relation to other content in frames of the first clip, or proximity of the first candidate placement to action represented in the first clip.

8. The method of claim 6, further comprising:
generating a plurality of scores based, at least in part, on the attributes, each score corresponding to a candidate placement of a plurality of candidate placements, each candidate placement corresponding to a surface of an object represented within a corresponding clip of the media content;
ranking the plurality of candidate placements using the scores such that each candidate placement of the plurality of candidate placements is assigned a ranking; and
selecting the first candidate placement based, at least in part, on the ranking assigned to each candidate placement of the plurality of candidate placements.

9. The method of claim 8, the attributes of the media content further comprising one or more of: a size of the first candidate placement relative to other content in the first clip, a duration of the first clip, an emotional tone of the first clip, a genre associated with the first clip, a topic of the first clip, a setting time associated with the first clip, a setting location of the first clip, a maturity age rating associated with the first clip, a mature content descriptor associated with the first clip, a country associated with the first clip, an audio language of the first clip, 3D information indicating a depth of the first object, 3D information indicating an orientation of the first object, 3D information indicating a position of the first object, proximity of the first object to action represented in the first clip, identities of individuals represented in the first clip, facts associated with the first clip, consumer ratings associated with the media content, consumer reviews of the media content, public recognition of the media content, or a production style of the media content.

10. The method of claim 6, further comprising:
selecting the plurality of secondary content items, wherein selecting the plurality of secondary content items includes selecting a first secondary content item from a repository of secondary content items based, at least in part, on attributes of the first secondary content item and the attributes of the media content, the attributes of the media content further including one or more of: an emotional tone of the first clip, a genre associated with the first clip, a topic of the first clip, a setting time associated with the first clip, a setting location of the first clip, a maturity age rating associated with the first clip, a mature content descriptor associated with the first clip, a country associated with the first clip, an audio language of the first clip, 3D information indicating a depth of the first object, 3D information indicating an orientation of the first object, 3D information indicating a position of the first object, proximity of the first object to action represented in the first clip, identities of individuals represented in the first clip, facts associated with the first clip, consumer ratings associated with the media content, consumer reviews of the media content, public recognition of the media content, or a production style of the media content.

11. The method of claim 6, further comprising:
selecting the plurality of secondary content items, wherein selecting the plurality of secondary content items includes selecting a first secondary content item from a repository of secondary content items based, at least in part, on attributes of a third object represented in a second secondary content item selected for a second candidate placement, the second candidate placement corresponding to a surface of a second object represented in a corresponding clip of the media content.

12. The method of claim 6, wherein the manifest excludes manifest data of the first clip of the media content.

13. A system, comprising one or more computing devices configured to:
ascertain attributes of media content, the attributes including, for a first clip of the media content, an identification of a first object represented in the first clip;
identify a first candidate placement using the attributes, the first candidate placement corresponding to a surface of the first object represented in the first clip;
select a plurality of secondary content items, wherein the plurality of secondary content items includes a first secondary content item comprising a representation of a second object, wherein selecting the plurality of secondary content items includes selecting the first secondary content item from a repository of secondary content items based, at least in part, on attributes of the second object represented in the first secondary content item, the attributes of the media content, and a set of rules including a mapping of scene types to attributes of secondary content items based on constraints configurable by a primary content provider specifying primary content attributes permitted to have secondary content item replacement, and constraints configurable by a secondary content provider specifying secondary content attributes permitted to be placed in primary content;
generate a plurality of replacement clips using the first clip and the plurality of secondary content items, each replacement clip including a representation of a corresponding secondary content item of the plurality of secondary content items positioned at the first candidate placement;
receive a request for the media content from a client device;
identify an account profile associated with the client device, wherein the account profile comprises characteristics of a user associated with the account profile;
for a candidate insertion point in the media content, select a first replacement clip of the plurality of replacement clips based on the account profile; and
provide a manifest to the client device, wherein the manifest comprises first manifest data referring to the one or more clips of the media content and second manifest data referring to the first replacement clip.

14. The system of claim 13, wherein the one or more computing devices are further configured to:
select the plurality of secondary content items for the first clip based, at least in part, on attributes of the first candidate placement, the attributes of the first candidate placement comprising one or more of: a duration of time that the first candidate placement is visible within the first clip, a placement type, a relative size of the first candidate placement in relation to other content in frames of the first clip, or proximity of the first candidate placement to action represented in the first clip.

15. The system of claim 13, wherein the one or more computing devices are further configured to:
generate a plurality of scores based, at least in part, on the attributes, each score corresponding to a candidate placement of a plurality of candidate placements, each candidate placement corresponding to a surface of an object represented within a corresponding clip of the media content;

rank the plurality of candidate placements using the scores such that each candidate placement of the plurality of candidate placements is assigned a ranking; and select the first candidate placement based, at least in part, on the ranking assigned to each candidate placement of the plurality of candidate placements.

16. The system of claim 15, the attributes of the media content further comprising one or more of: a size of the first candidate placement relative to other content in the first clip, a duration of the first clip, an emotional tone of the first clip, a genre associated with the first clip, a topic of the first clip, a setting time associated with the first clip, a setting location of the first clip, a maturity age rating associated with the first clip, a mature content descriptor associated with the first clip, a country associated with the first clip, an audio language of the first clip, 3D information indicating a depth of the first object, 3D information indicating an orientation of the first object, 3D information indicating a position of the first object, proximity of the first object to action represented in the first clip, identities of individuals represented in the first clip, facts associated with the first clip, consumer ratings associated with the media content, consumer reviews of the media content, public recognition of the media content, or a production style of the media content.

17. The system of claim 13, wherein the one or more computing devices are further configured to:

select the plurality of secondary content items, wherein selecting the plurality of secondary content items includes selecting a first secondary content item from a repository of secondary content items based, at least in part, on attributes of the first secondary content item and the attributes of the media content, the attributes of the media content further including one or more of: an emotional tone of the first clip, a genre associated with the first clip, a topic of the first clip, a setting time associated with the first clip, a setting location of the first clip, a maturity age rating associated with the first clip, a mature content descriptor associated with the first clip, a country associated with the first clip, an audio language of the first clip, 3D information indicating a depth of the first object, 3D information indicating an orientation of the first object, 3D information indicating a position of the first object, proximity of the first object to action represented in the first clip, identities of individuals represented in the first clip, facts associated with the first clip, consumer ratings associated with the media content, consumer reviews of the media content, public recognition of the media content, or a production style of the media content.

18. The system of claim 13, wherein the manifest excludes manifest data of the first clip of the media content.

19. The system of claim 13, wherein the one or more computing devices are further configured to:

receive a request from the primary content provider to update the constraints configurable by the primary content provider; and update the mapping of the scene types to the attributes of secondary content items based on the updated constraints.

20. The system of claim 13, wherein the one or more computing devices are further configured to:

receive a request from the secondary content provider to update the constraints configurable by the secondary content provider; and update the mapping of the scene types to the attributes of secondary content items based on the updated constraints.

* * * * *